(12) United States Patent
Jacobs et al.

(10) Patent No.: US 9,781,064 B2
(45) Date of Patent: Oct. 3, 2017

(54) METHOD AND SYSTEM FOR CREATING AND DISTRIBUTING ELECTRONIC POSTCARDS

(71) Applicants: Robert Jacobs, Franklin, NY (US); Eric D. Kroll, San Francisco, CA (US)

(72) Inventors: Robert Jacobs, Franklin, NY (US); Eric D. Kroll, San Francisco, CA (US)

(*) Notice: Subject to any disclaimer, the term of this patent is extended or adjusted under 35 U.S.C. 154(b) by 50 days.

(21) Appl. No.: 14/447,451

(22) Filed: Jul. 30, 2014

(65) Prior Publication Data

US 2015/0039709 A1 Feb. 5, 2015

Related U.S. Application Data

(60) Provisional application No. 61/862,011, filed on Aug. 3, 2013.

(51) Int. Cl.
*G06F 15/16* (2006.01)
*H04L 12/58* (2006.01)

(52) U.S. Cl.
CPC .................. *H04L 51/10* (2013.01)

(58) Field of Classification Search
CPC ............ H04L 12/40013; H04L 63/08; H04L 63/1408; H04L 51/28; H04L 51/10; H04L 51/38; G06F 15/16; G06F 21/6209
USPC ........................... 709/206; 348/221
See application file for complete search history.

(56) References Cited

U.S. PATENT DOCUMENTS

| 5,343,386 A | 8/1994 | Barber |
| 5,587,740 A | 12/1996 | Brennan |
| 6,018,774 A | 1/2000 | Mayle et al. |
| 6,161,131 A * | 12/2000 | Garfinkle ............. G06Q 10/107 709/204 |
| 6,370,568 B1 | 4/2002 | Garfinkle |
| 7,120,590 B1 * | 10/2006 | Eisen .................... G06Q 10/107 705/14.73 |
| 2007/0069030 A1 * | 3/2007 | Sauerwein ........... G06Q 10/083 235/462.46 |
| 2008/0059585 A1 * | 3/2008 | Block ..................... H04L 51/00 709/206 |
| 2009/0082095 A1 * | 3/2009 | Walker ..................... G07F 17/32 463/25 |
| 2010/0185391 A1 * | 7/2010 | Lee ...................... G06F 17/3087 701/532 |
| 2011/0007901 A1 * | 1/2011 | Ikeda ....................... H04B 5/02 380/270 |
| 2011/0201373 A1 * | 8/2011 | Suzuki .................... H04W 4/08 455/517 |

(Continued)

*Primary Examiner* — Tesfay Yohannes
(74) *Attorney, Agent, or Firm* — Michael Keenan; Hinman, Howard & Kattell, LLP (57) ABSTRACT

Method and system for creating and distributing professional quality electronic postcards are provided. An accessible library of numerous photographs/videos taken by professionals is maintained, for example, on a app or website. Access to the app or website can be accomplished using any suitable input device, for example smart phones, tablets, laptops, computers etc. Following a series of simple steps, users select from an assortment of images, videos, photos, messages, etc., to create an electronic postcard. Users have their own pages on the app or website, where sent and received electronic postcards are stored. A simple method for creating albums from the user's electronic postcards is also provided.

20 Claims, 12 Drawing Sheets

(56) References Cited

U.S. PATENT DOCUMENTS

| | | | |
|---|---|---|---|
| 2011/0292231 A1* | 12/2011 | Winters | G06F 17/30265 |
| | | | 348/222.1 |
| 2013/0147626 A1* | 6/2013 | Hammoud | G08B 13/22 |
| | | | 340/569 |
| 2014/0100964 A1* | 4/2014 | Kramer | G06Q 30/02 |
| | | | 705/14.66 |
| 2015/0039709 A1* | 2/2015 | Jacobs | H04L 51/10 |
| | | | 709/206 |

* cited by examiner

METHOD AND SYSTEM FOR CREATING AND DISTRIBUTING ELECTRONIC POSTCARDS

CROSS-REFERENCE TO RELATED APPLICATION

This application claims the benefit of U.S. Provisional Patent Application No. 61/862,011, filed on Aug. 3, 2013, the entire contents of which are herein incorporated by reference.

BACKGROUND OF THE INVENTION

Many travelers enjoy sending postcards to friends and family to let those they care about know that they are thinking about them. Often, these postcards show something about the place that the sender is visiting so that the recipient of the postcard can share in the feeling of being in a beautiful, historic or meaningful location.

The use of traditional postcards has decreased consistently since 1980. There are a number of reasons for this on-going decline—traditional postcards are often costly and time-consuming, particularly if there are many recipients. Mailed postcards can take significant time to reach their destination, especially if the place where they are being sent from is distant. Sometimes, the sender has already returned from her trip before the postcard arrives home. Mailing a postcard requires a fair amount of effort—the sender has to buy the card, handwrite a message, find and affix stamps and finally find a post office or mailbox. These difficulties only increase when traveling abroad.

Electronic communication has provided new ways to communicate greetings and short messages that have typically been sent on cards such as greeting cards and postcards. A number of vendors previously maintained apps or websites that enabled a person to create and send an electronic "greeting card" via e-mail. Such websites provide a plurality of "cards" each having graphics and an associated message to which the sender can add a typed personal message.

U.S. Pat. No. 5,343,386 shows an apparatus housed in a booth for producing printed postcards incorporating a self-portrait of the sender in front of one of several optional pictorial backgrounds. A cash-receiving device, a video camera, a monitor and background selection buttons are connected to a computer that controls the operation of the apparatus.

U.S. Pat. No. 5,587,740 shows a kiosk equipped with a digital camera for taking a photograph of a client in front of a scenic attraction. The kiosk also includes a computer, a credit card reader, a telephone connection and a color printer.

U.S. Pat. No. 6,018,774 shows a system for creating an electronic postcard incorporating a client supplied image and optional text, such as a handwritten message, and sending a notification with an identifier to a recipient. The recipient must access a server with the identifier to view and print the postcard.

U.S. Pat. No. 6,161,131 and the related U.S. Pat. No. 6,370,568 show an apparatus for creating a digital postcard and sending the postcard to a recipient via the Internet. The apparatus includes a digital camera for generating an image that is combined with a selected postcard template including geographical information overlaid on the image.

More recently, particularly since the advent of the cell phone, these apps or websites have become far more sophisticated. Sites such as Pinterest® and Facebook® allow you to efficiently display and/or send your own photos. Over 1.4 billion photos are taken each day using cell phones, with approximately 638 million photos being posted each day on social media sites such as Facebook®. In fact, Facebook® now stores ten thousand times as many photos as the Library of Congress.

The overarching problem with all the foregoing systems and methods has been the quality of the photography. The earlier methods frequently utilized digital cameras, but no matter how sophisticated the camera, in the hands of an amateur, amateur pictures will result. This is exacerbated in cell phone photography—not only are the photos still being taken by amateurs, but the camera itself is inferior.

SUMMARY OF THE INVENTION

The present invention provides a method and system which produces electronic postcards that combine the quality of professional photography with the ease of delivery systems such as social media, text messaging and email. A members-only app or website includes a library comprised of thousands of photographs, images, videos, etc., all taken by professional photographers, videographers, etc. With just a few clicks, users can:

(1) login and be located by GPS;
(2) select a photo associated with their current location or select a different location;
(3) select a photo from the library of professionally taken photos;
(4) select a standard message or draft one of his/her own; and
(5) send the electronic postcard.

Additional features include personalized client apps or webpages which retain all sent and received electronic postcards. Further, using user's own electronic postcards or other photos from the library, users can easily compile albums memorializing their trip, special occasion, etc. Optionally, user own photos can be incorporated into their albums.

In one example, the system can upload multiple photos, images, videos, etc., corresponding to a particular location and display each individually or as thumbnails on a page bearing multiple images. The user can select one or a few photos to create an electronic postcard, or numerous items when compiling an album.

The details of one or more implementations are set forth in the accompanying drawings and the description below. Other features and advantages will be apparent from the description and drawings, and from the claims.

BRIEF DESCRIPTION OF THE DRAWINGS

The above, as well as other advantages of the present invention, will become readily apparent to those skilled in the art from the following detailed description of a preferred embodiment when considered in the light of the accompanying drawings. Although the illustrated embodiment is merely exemplary of systems, methods, and apparati for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended hereto or as subsequently amended, but merely to clarify and exemplify the invention.

DESCRIPTION OF THE PREFERRED EMBODIMENT

The invention may be understood more readily by reference to the following detailed description of a preferred embodiment of the invention. However, techniques, systems, and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

Typically, a person desiring to send a postcard from a travel location must first find a postcard sales location, then address the card to the intended recipient, purchase and affix the proper postage and find a post office or mailbox to mail the card. All of these steps take time and effort, and a failure to complete any one step frustrates the objective of informing the addressee that the sender was thinking about him or her. The system and method according to the present invention simplifies or eliminates each of the above-described steps so that "postcards" are easier to send and thus more likely to be sent.

Figure 1:
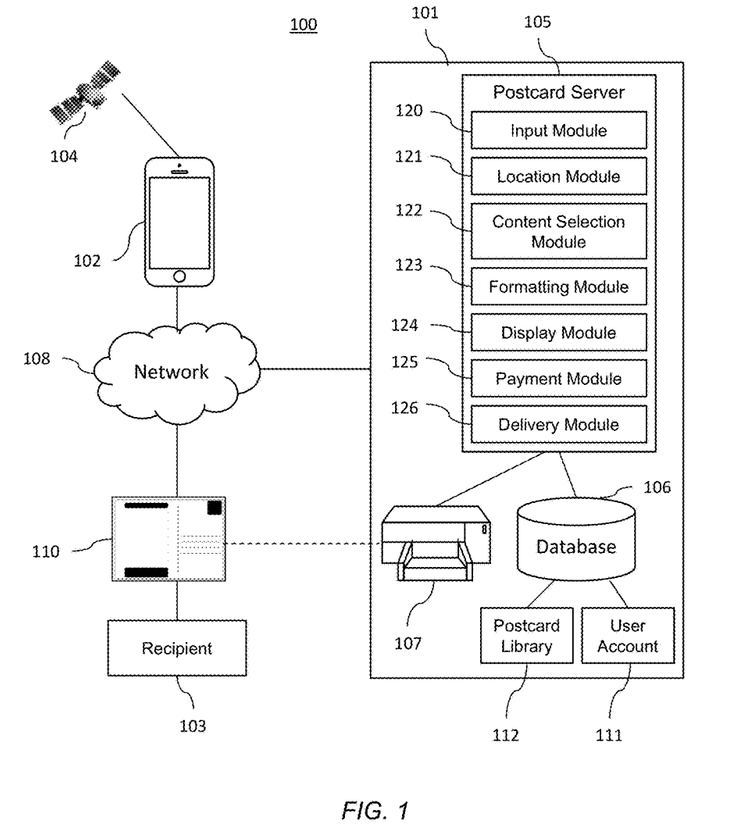
FIG. 1 is a schematic diagram illustrating a system for providing an electronic postcard according to a preferred embodiment of the present invention.

Referring to FIG. 1, there is shown a schematic diagram illustrating system 100 for providing electronic postcards according to a preferred embodiment of the invention. System 100 comprises client 102 and a system computer 101 for exchange of information required for providing an electronic postcard 110 over a network 108 to a recipient 103 according to a preferred embodiment of the invention. Client 102 may be operated by or associated with a user who desires to create and send an electronic postcard 110 to a recipient 103. Client 102 and/or recipient 103 may comprise any communication device known in the art or later discovered, including, but not limited to a computer, personal computer, desktop computer, laptop computer, mobile device, handheld device, cellular telephone, smart phone, web-enabled cellular telephone, personal digital assistant, tablet, televisions or set top boxes supporting video on demand (VOD), interactive televisions, smart television, internet television, or the like. In a preferred embodiment, client and/or recipient 102 comprise a display, a processor, a memory, and a user interface (e.g., a touch screen, keyboard, mouse, voice recognition, or the like).

System computer 101 may be operated by a postcard service provider to provide the interface to the person using client 102 to create and send electronic postcards. System computer 101 may comprise a postcard server 105. Postcard server 105 may be incorporated into a conventional stand-alone server, although in other embodiments, the function of the postcard server may be distributed across multiple computing systems and architectures. For example, system 100 may include a separate web or app server as an interface between the postcard server 105 and the client 102. System 100 may further include a separate web, app, or email server as an interface between the postcard server 105 and the recipient 103. The postcard server 105 is preferably a network server utilizing processing modules for processing information received to create and send the electronic postcard 110. The postcard server 105 and/or other system servers may include at least one controller or processing module (CPU or processor), at least one communications module port or hub, at least one random access memory module and one or more data storage modules. All of these latter elements are in communication with at least one processing module to facilitate the operation of the system computer 101 of the present invention.

The information between system components may be transmitted across any network 108 known in the art, or later discovered, including but not limited to wired, wireless, Internet, intranet, Ethernet, WAN (wide area network), LAN (local area network), virtual private network, Wi-Fi, WLAN (wireless local area network), cellular or mobile, GSM (Global System for Mobile Communications), CDMA (Code division multiple access), ISDN (Integrated Services Digital Network), Bluetooth, CATV (cable television), satellite, or the like. Network 108 may include both wired and wireless connections, including optical links. It should also be appreciated that multiple networks may be used to transmit information between different system components, and that some or all of these networks may be private, dedicated networks in addition to the use of public networks such as the Internet.

The system computer 101 may further comprise a database 106. The database 106 may include a postcard library 112 of postcard content. The postcard library 112 may comprise thousands of photographs, paintings, images, drawings, videos, animation, etc., all taken by professional photographers, videographers, etc. In a preferred embodiment, the postcard library 112 comprises a collection of professional postcards that were published and sold in paper form all over the world, for example, in souvenir stands located at vacation spots. This collection can include current, antique, or vintage postcards. These paper form postcards are digitized and cataloged in the postcard library 112. The postcards may be digitized in any way known in the art or later discovered, including, but not limited to a scanner, a camera, or the like. The content in the postcard library 112 may be indexed or cataloged based on various categories, such as location (e.g., city, state, country), nature, animals, people, or the like. This enables the display of content on client 102 and selection of content by the user based on the categories.

The database 106 may further store information associated with the client 102, including a user account 111. Postcard server 105 may interface with the database 106 to provide secure storage and access to all information associated with the client 102. For example, database 106 may store in the user account 111 previously sent postcards, postcard drafts, a contact list of recipients and their communications addresses, user's photo albums, or the like.

The database 106 may be co-located with the postcard server 105, or it may represent distributed data systems located remotely in various different systems and locations. Postcard server 105 and database 106 may include any one of numerous forms of storage devices and storage media, such as solid-state memory (RAM, ROM, PROM, and the like), magnetic memory, such as disc drives, tape storage, and the like, and/or optical memory, such as DVD.

Postcard server 105 may further comprise a plurality of modules for enabling the creation and deliver of an electronic postcard 110. For example, the postcard server 105 may include an input module 120, a location module 121, content selection module 122, formatting module 123, display module 124, payment module 125, and delivery module 126.

If the system receives a response from the client indicating that the user wishes to send an electronic postcard 110, the input module 120 queries the user at client 102 for input information. Particularly, the input module 120 provides one or more screens for display on the client 102 where the user may customize and personalize the electronic postcard 110 by, for example, inputting user's location, selecting particular content to include in the electronic postcard 110, entering a message, selecting a recipient, selecting notifications (e.g., to notify the user when the postcard is sent and/or delivered), or the like.

The location module 121 obtains location information of the client 102. Location information may be obtained in any way known in the art, either directly from client 102, or through other means. For example, location data may be obtained by means of a global positioning system (GPS) 104, triangulation of cellular telephone towers, Wi-Fi-based positioning system (WPS), IP address, device sensors, or the like. Alternatively, or in addition, the user may enter his/her current location via client 102.

The content selection module 122 queries the postcard library 112 at the database 106 to select the content to present to the user on client 102 or to include in the electronic postcard 110. The content selection module 122 may select content based on the location information received from the location module 121, based on any category selected by the user, or it may randomly select content. The display module 124, may display the selected content, or a group of content for selection, to the user.

The formatting module 123 formats the electronic postcard 110 based on the information inputted and selected by the user of client 102 and prepares the electronic postcard 110 for delivery. The formatting module 123 may format the electronic postcard 110 based on stored templates on the database 106. Alternatively, the formatting module 123 may format the electronic postcard 110 based on user preference. The postcard 110 may be formatted to be displayed in any form, including as an image, video, animation, text, logo, photograph, other graphics, or the like, and any combinations thereof. The display module 125 may display the finalized electronic postcard 110 to the user at client 102 for approval.

Once the user selects that they wish to send the message, the postcard sending procedure begins. In a preferred embodiment, the user is a member of the electronic postcard service and has an associated user account 111. The payment module 125 handles the payment procedure, by for example, initiating a credit card payment. The credit card information may be entered by the user or it may be pre-stored in the user account 111. Various fees can be charged for various services. For example, a member can pay an annual fee to send an unlimited number of electronic postcards and for the service to maintain pages relating to member's sent and received postcards. Alternatively, the member could pay a monthly, weekly, daily or one-time fee. If the user is not yet a member, he/she is prompted to enter their debit or credit card number.

After a payment is made (or if payment is not required), the delivery module 126 delivers the electronic postcard 110 recipient 103 via network 108. The electronic postcard 110 may be delivered to the recipient 103 via any known or later discovered platforms. The postcard may be delivered to the recipient 103 via an email, a text message, a webpage, an app, a social media webpage, a video-sharing website, or the like. Upon delivery, the recipient 103 may open the electronic postcard 110 for viewing. The display module 125 may display the electronic postcard 110 to the user at the recipient 103.

In an alternative embodiment, the postcard service provider may send the postcard 110 via traditional mail. In this embodiment, the system displays to a user a postcard type screen. The postcard type screen prompts the user to choose either an electronic postcard to be sent via email, etc., or alternatively a traditional postcard that is printed and mailed to a recipient through traditional mail. In addition, the user may be given an option to select various delivery periods overnight, next business day, two day, or the like. After the postcard is created electronically via the postcard server 105, the postcard service provider prints the postcard via printer 107, affixes a stamp, and mails the postcard to the recipient 103. Alternatively, the service provider may contract printing services from printing companies located in locations near the recipient 103 to ensure that the postcard 110 is delivered to the recipient 103 in time. Thus, although the user may be creating the postcard abroad, the postcard may be printed and delivered to the recipient 103 locally.

Figure 2:
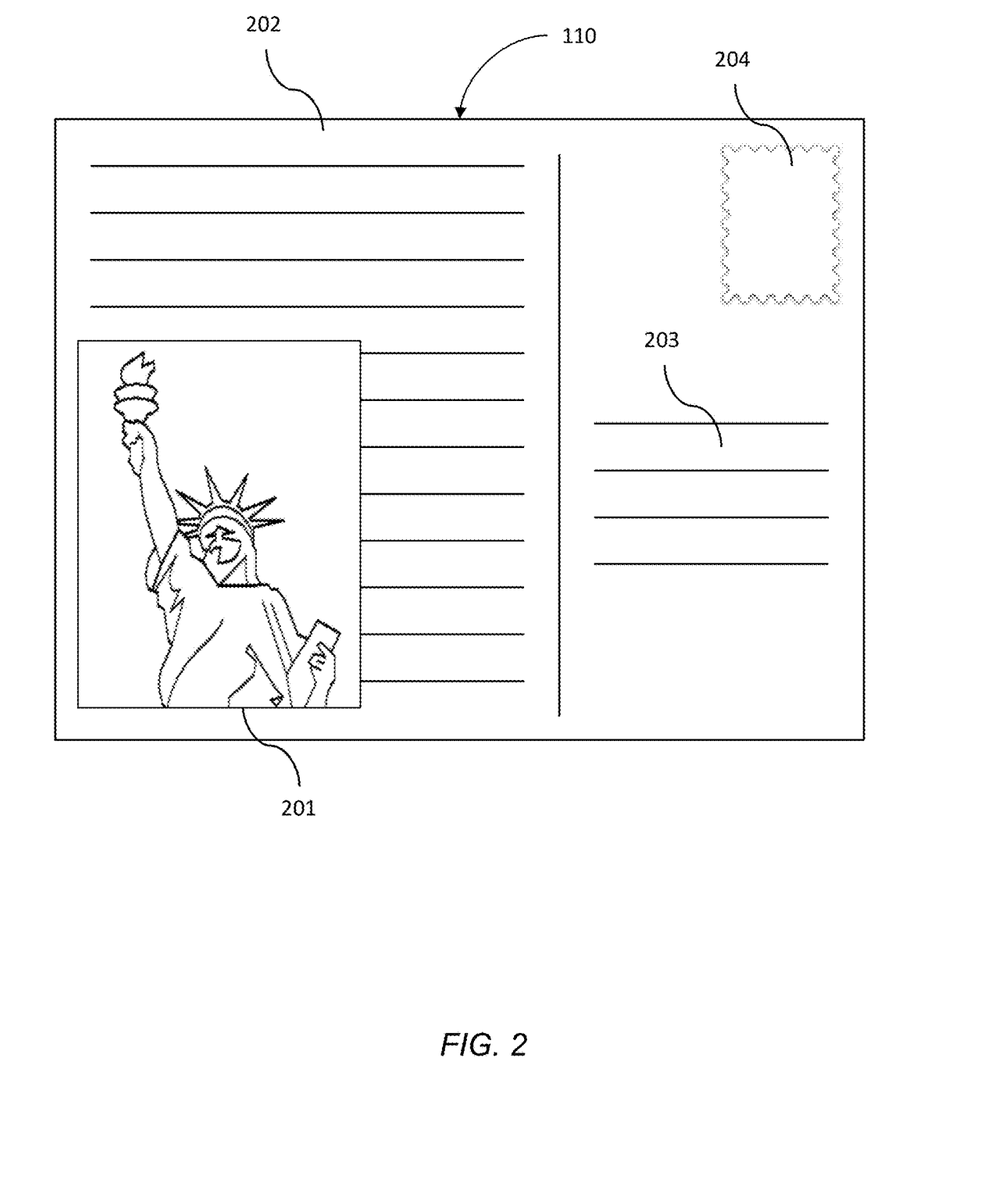
FIG. 2 illustrates an exemplary electronic postcard according to a preferred embodiment of the present invention.

FIG. 2 illustrates an exemplary electronic postcard 110 of the present invention. The electronic postcard 110 of the present invention has three elements. A first element is the content 201 selected by the user. As illustrated, content 201 may be a single professionally taken image of a travel destination, a tourist attraction, a monument or artwork that is associated with a specific location. For example, the image on a card for New York may be the Statue of Liberty. The first element may consist of video, many images composited together, or a slideshow, rather than one image. Optionally, the user may also add drawings, comments, etc., in this image element. A second element 202 is a place to write a message to the receiver of the electronic postcard 110. Alternatively, message 202 may be a standard message selected by the user or the postcard server 105. As a third element, the postcard contains an address area 203, where the address of the recipient is placed. In addition, the postcard may contain an image of a stamp 204, which may be selected by the user. As illustrated, the first, second, and third elements may be displayed on a single page. In an alternative embodiment, the electronic postcard 110 is animated and can be flipped to reveal the postcard image 201 on its front and the message 202 and address area 203 on its rear—just like in a conventional postcard. A hard copy postcard that is selected to be delivered via traditional mail may be formatted as a conventional postcard as well.

Figure 3:
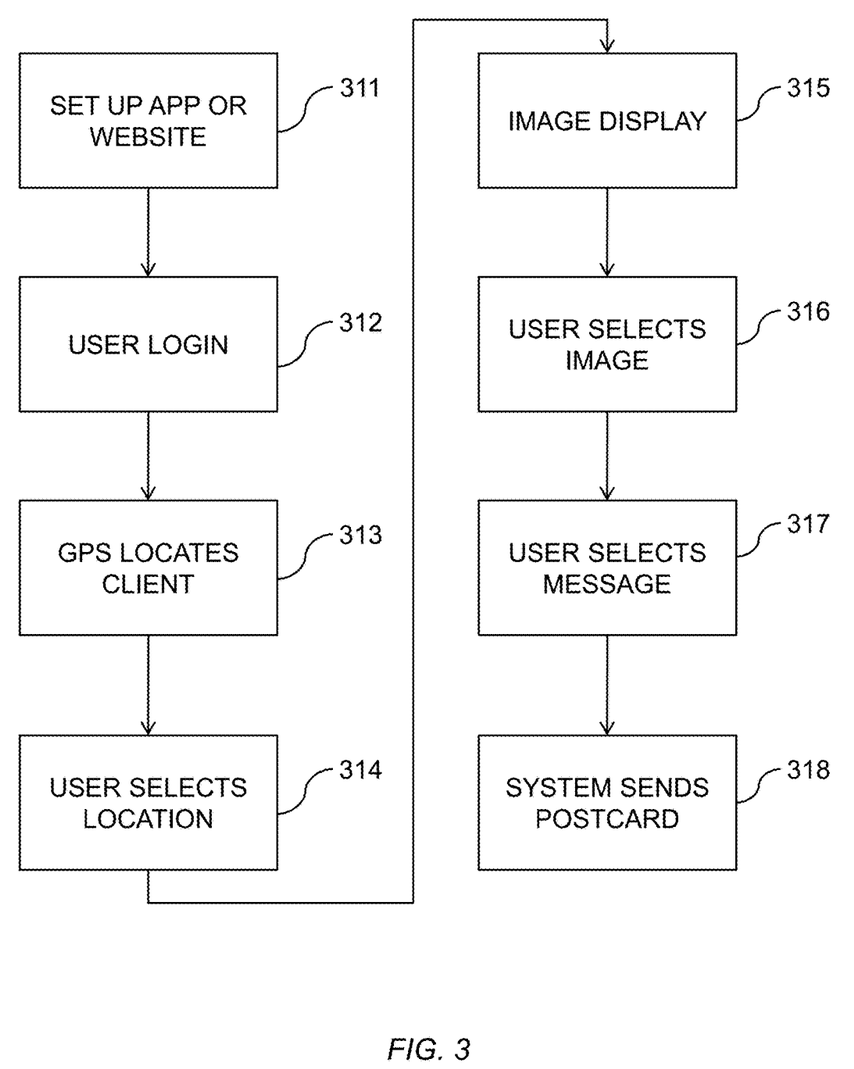
FIG. 3 is a flow diagram of a method for creating the electronic postcard according to a preferred embodiment of the present invention.

Turning now to FIG. 3, the exemplary flow diagram of the method according to the present invention begins at a step 311 by establishing an app or website to enable a user to access the app or website using a client 102 to create and send an electronic postcard 110. In a typical application, user will login via client 102 to the electronic postcard app or website at step 312. In this regard, the user has already created a user account 111. If an account has not been created, the user may create an electronic postcard without an account as a guest, or the user may register with the system. Integrated GPS, or other positioning system, locates the client 102 at step 313. At step 314 the user is offered the opportunity to select a photo or image corresponding to his or her current location. In the alternative, the user can select a different location. Depending on the client's selection, photos from the library are displayed, either individually or as multiple thumbnails in step 315. In step 316, the user selects one or more photos to create an electronic postcard 110 and/or a photo album. If the postcard option is selected, the user is given the option of selecting via client 102 a standard message from a drop-down table in step 317. In the alternative, the client may draft his/her own message. In the last step (step 318), the system sends the electronic postcard to any desired recipient(s).

In FIG. 4A through FIG. 4I, an embodiment of the present invention is depicted using a smart phone 400 as the client device 102. It should be appreciated, however, that any appropriate client input device may be substituted for the smart phone 400. Further, particular steps may be added, subtracted or changed as deemed appropriate.

Figure 4A:
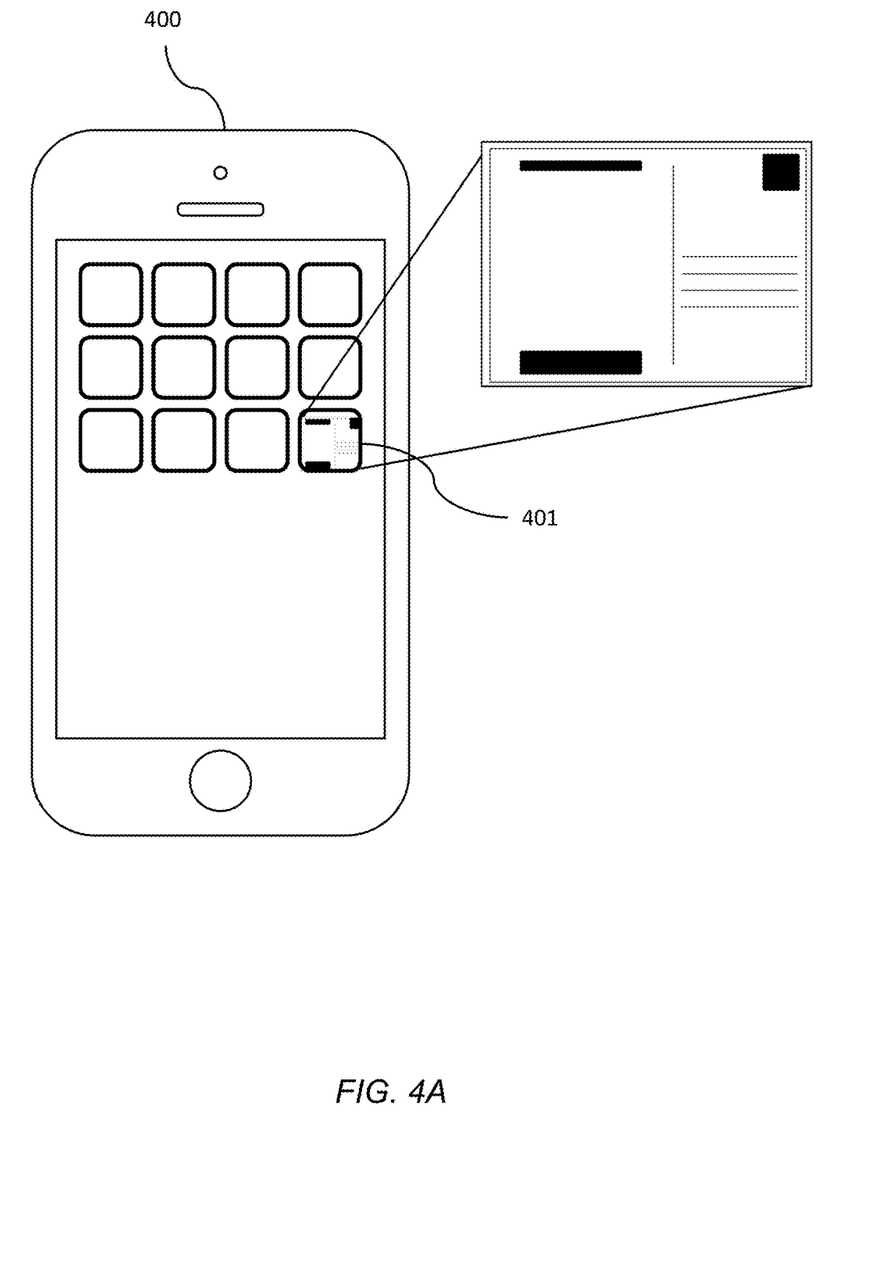
FIG. 4A is a screenshot of a cell phone having an icon allowing access to the electronic postcard app or website according to a preferred embodiment of the present invention.

Turning now to FIG. 4A, the home screen of a smart phone 400 is depicted showing an icon 401 for the electronic postcard app or website of the present invention.

Figure 4B:
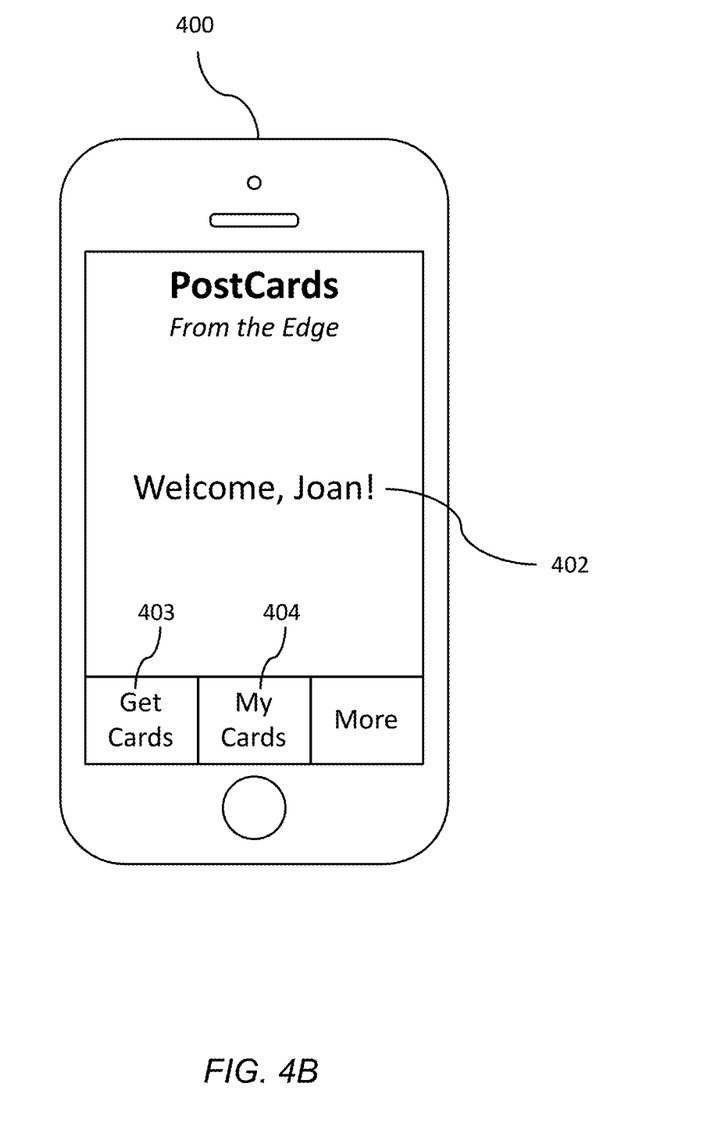
FIG. 4B is a screenshot of a cell phone depicting the Welcome Screen of the electronic postcard app or website according to a preferred embodiment of the present invention.

By clicking on said icon, the client 400 is taken to the welcome screen 402 of the app or website, seen in FIG. 4B. The client 400 displays several options on the welcome screen for selection by the user, including the options to prepare an electronic postcard at 403 or review previously sent or received postcards at 404.

Figure 4C:
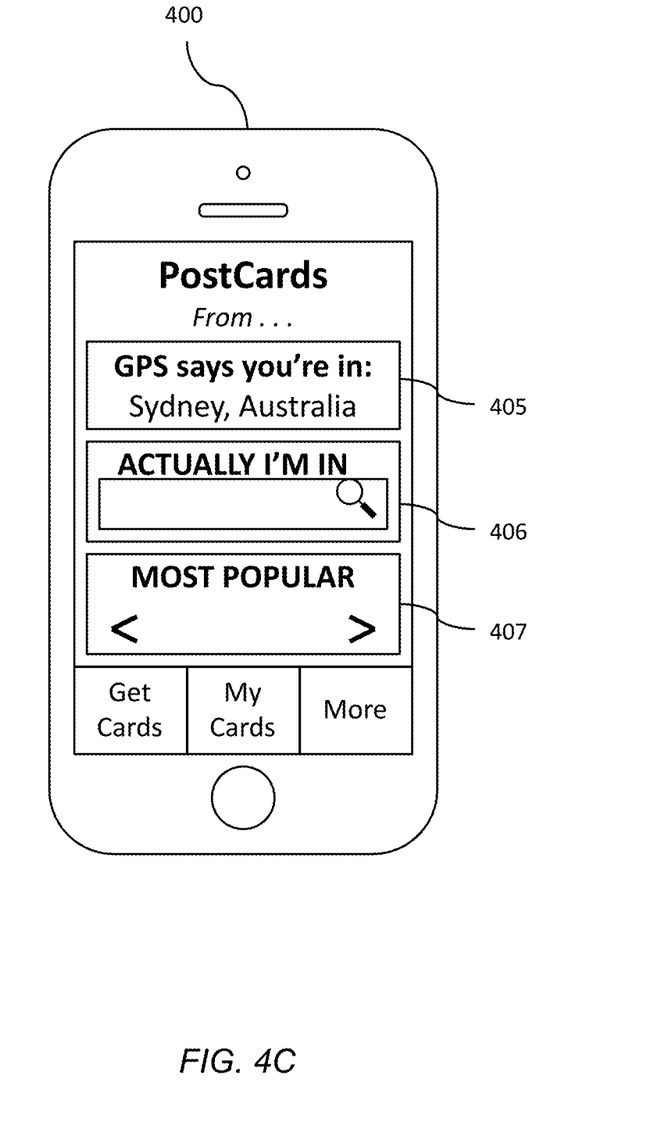
FIG. 4C is a screenshot of a cell phone depicting the Set Location Screen of the electronic postcard app or website according to a preferred embodiment of the present invention.

If the user chooses to create a new electronic postcard, the app or website in combination with the smart phone 400 determines client's current location using integrated GPS and displays that location at 405 in FIG. 4C. The user has the option of reviewing photos corresponding to his/her current location. Alternatively, the user can enter a different location at 406 and review photos corresponding thereto. In this embodiment, the user is also given the option of choosing from the most popular locations at 407 as determined by app or website activity.

Figure 4D:
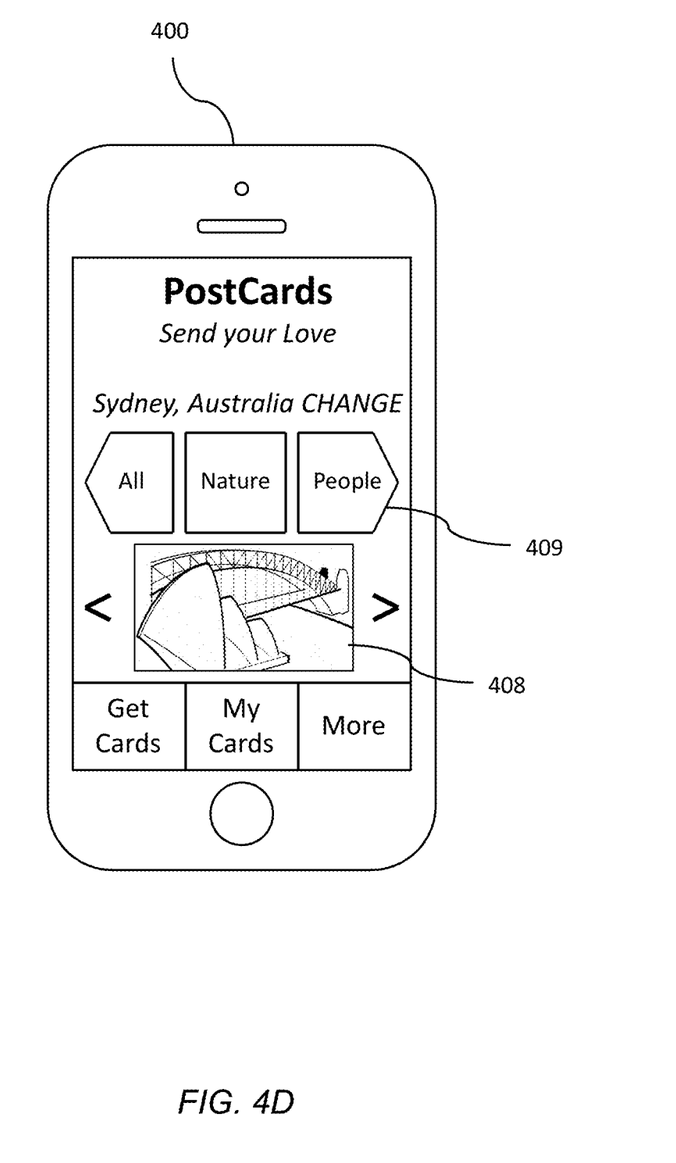
FIG. 4D is a screenshot of a cell phone depicting the Select Postcard Screen of the electronic postcard app or website according to a preferred embodiment of the present invention.
Figure 4E:
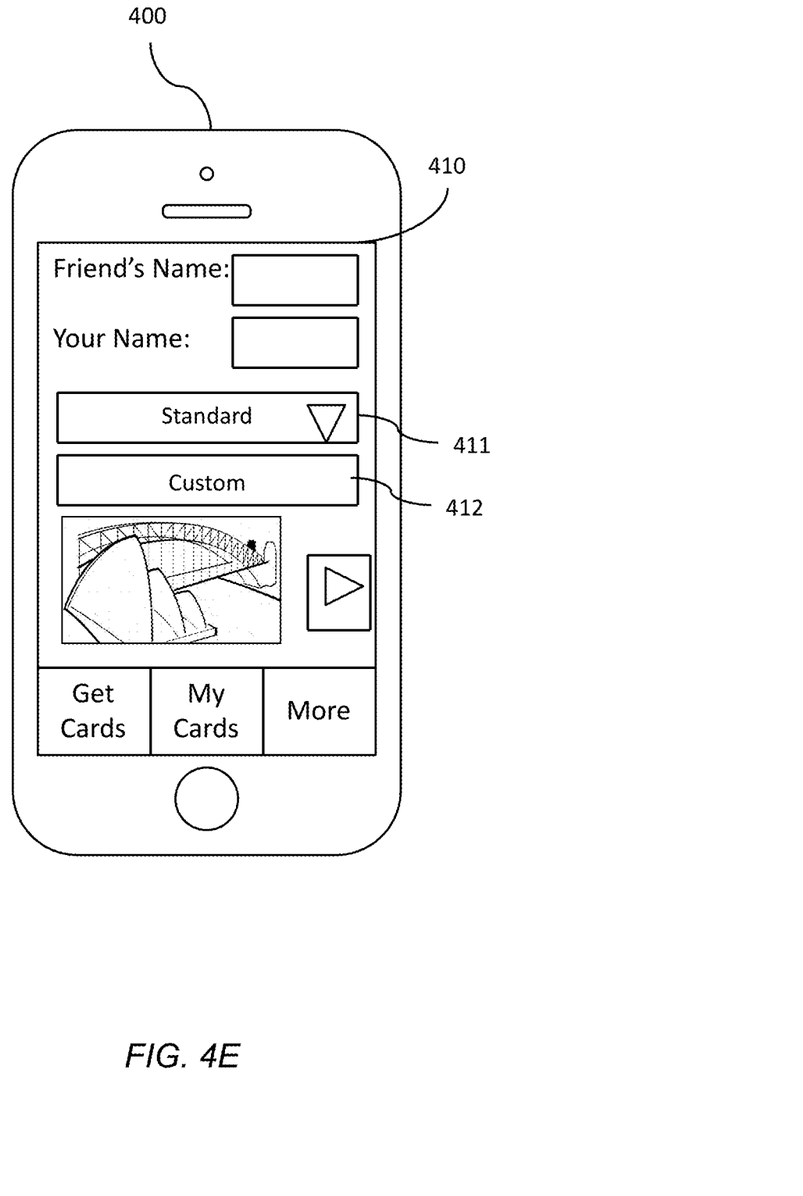
FIG. 4E is a screenshot of a cell phone depicting the Write Message Screen of the electronic postcard app or website according to a preferred embodiment of the present invention.

In FIG. 4D, after the user has selected a location, all photos associated with that location are available for display at 408. The photos can be categorized in any number of ways. "All," "Nature" and "People" are the categories shown in FIG. 4D at 409, but it should be understood that any number of additional categories, such as Monuments, Sites of Historical Interest, Architecture, Landscapes and many more will be appropriate depending on location. Further, the user may be prompted to select as one possibility a "standard" option. Under the "standard" option, the system automatically selects, for example, the most popular photo associated with a given location along with the most popular message. This option allows the user to send a postcard with the minimum number of keystrokes, clicks or steps possible.

In another embodiment, in addition to a single image of a travel destination, a tourist attraction, a monument or artwork that is associated with a specific location, the user may select additional multimedia elements to insert into the electronic postcard. The user may insert drawings, comments, animation, a slide show of local tourist attractions, 360 degree panorama views, virtual tours, and video clips of the user and/or others, etc.

Once the photo is selected, the system receives a selection from the user that they wish to compose a message to the recipient. The system presents the user with a message window 410 in FIG. 4E in which they can select or type a message to recipient. Standard messages are provided in a drop-down menu 411. Alternatively, user can write a personalized message in input box 412. The user may be prompted to select from several different fonts, colors, sizes, etc., for the text of the message. At least one of the fonts is designed to look like handwriting. Alternatively, a touch screen would give the user the option of actually handwriting his/her message. In another embodiment, the user can dictate a message that the recipient can listen to.

Figure 4F:
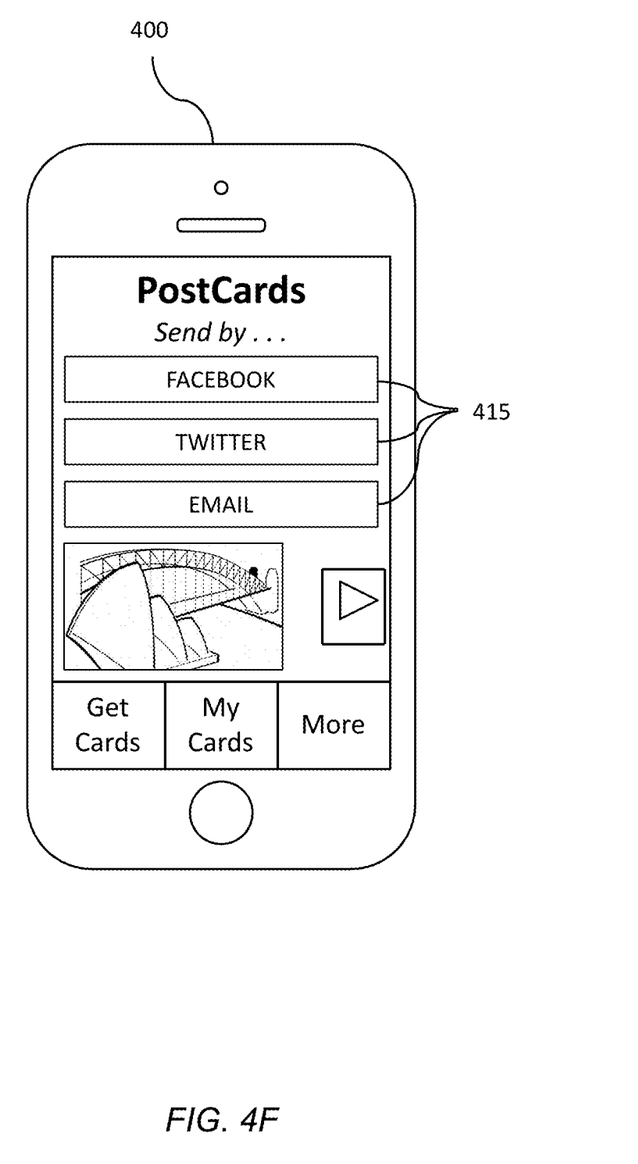
FIG. 4F is a screenshot of a cell phone depicting the Send Screen of the electronic postcard app or website according to a preferred embodiment of the present invention.
Figure 4G:
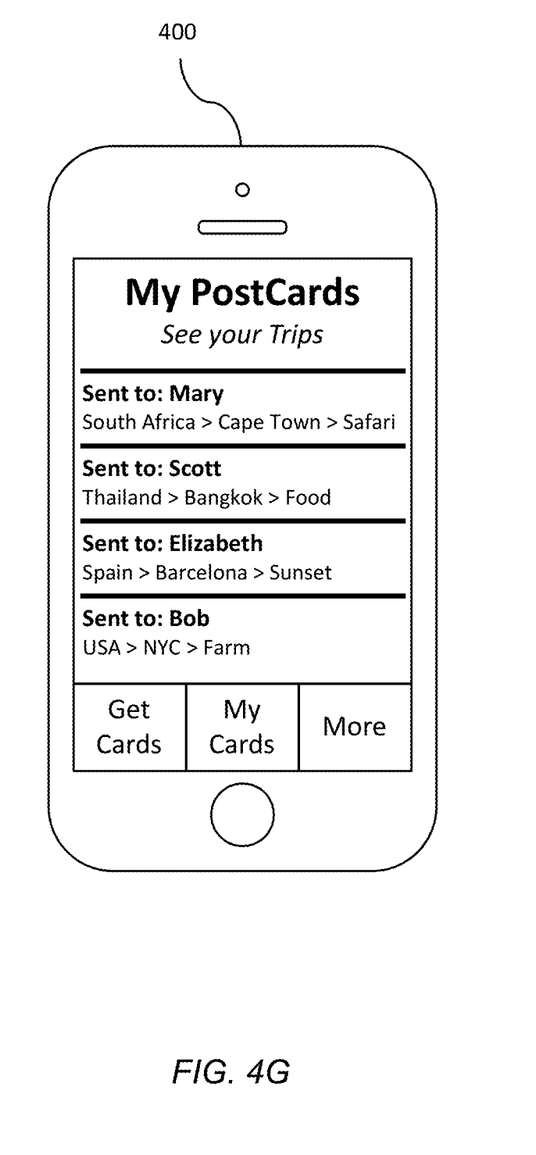
FIG. 4G is a screenshot of a cell phone depicting the Browse Sent Postcards Screen of the electronic postcard app or website according to a preferred embodiment of the present invention.

Once the message is complete, the system generates an address screen shown in FIG. 4F that prompts the user to enter a Facebook®, Twitter® or e-mail address, etc. at boxes 415, if the electronic postcard is to be sent electronically, or a physical address if the electronic postcard is to be sent through traditional mail. The user is given the option of sending the postcard to more than one person. If the user selects this option, the user is prompted to enter address information for each additional person or entity that they wish to be a recipient. Additionally, the user is given the option of using an address book stored in a user account 111 on database 106 of the electronic postcard server 105 to insert the address. This option will be available to users who have already opened up an account on the postcard server. Once the system receives the phone number or an e-mail/social media address of a recipient, the client is prompted to send the message. Alternatively, the postcard server can automatically obtain numbers/addresses by accessing phone, contacts, address book, etc, stored by the client 102.

In an additional embodiment of the present invention, the electronic postcard server 105 tracks previous messages sent by a particular user. The server 105 prompts the user addressing a new postcard to select the address of one of the previous recipients, or to enter a new address. The user could alternatively be prompted to send the message at a specific later date, such as on a recipient's birthday. If the user selects this option, the system prompts the user to enter the date that the user wishes the electronic postcard to be sent.

Figure 4H:
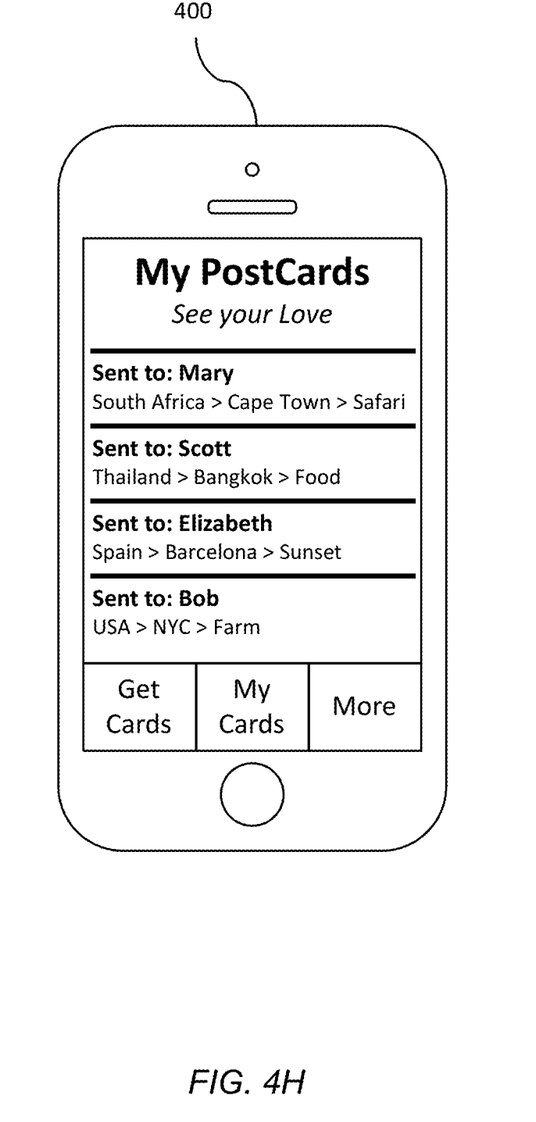
FIG. 4H is a screenshot of a cell phone depicting the Browse Received Postcards Screen of the electronic postcard app or website according to a preferred embodiment of the present invention.

The foregoing all describe the options available to user if he/she selects the Get Cards option 403 on the home screen. If user selects the My Card option 404 instead, he/she will be able to review cards previously sent (FIG. 4G) or received (FIG. 4H). Items saved at these locations can easily be compiled into albums.

Figure 4I:
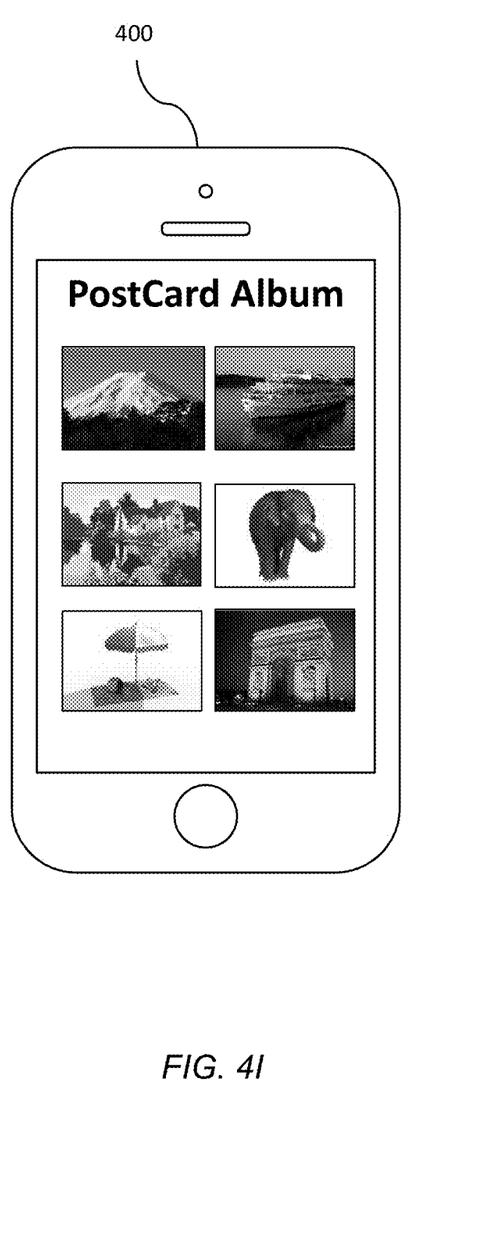
FIG. 4I is a schematic of a screen depicting multiple accessible images in thumbnail form for easy creation of photo albums according to a preferred embodiment of the present invention.

In addition to user's own electronic postcards, the present invention makes it easy for users to also select other photos from the library to compile albums memorializing their trip, special occasion, etc. FIG. 4I shows an alternative where photos corresponding to a particular location may be viewed as thumbnails for ease of selection. Optionally, users' own photos can also be incorporated into their albums. Users may also be given the option (with appropriate permissions) to view postcards and/or albums of friends and family, etc.

While the above description contains many specific details, these should not be construed as limitations on the scope of the invention, but rather as an exemplification of preferred embodiments thereof. Other variations are possible. Accordingly, the scope of the invention should be determined not by the preferred embodiment illustrated, but by the appended claims and their legal equivalents, as put forth hereinafter. Further, it will be apparent to those of skill in the art that numerous changes may be made in such details without departing from the spirit and the principles of the invention. It should be appreciated that the invention is capable of being embodied in other forms without departing from its essential characteristics.

The invention claimed is:

1. A method for creating and sending an electronic postcard comprising:
   a server for processing postcards, wherein the server includes content selected from the group consisting of professional-quality photographs, drawings, paintings, images, videos, animation, and any combination thereof;
   connecting via a client to the server for processing electronic postcards;
   detecting the location of the client using a location module that detects the location of the client via at least one selected from the group consisting of global positioning system, cellular telephone tower triangulation, Wi-Fi based positioning system, IP address, device sensor, an input received from the client, and any combination thereof;
   displaying on said client one or more content that is included in the server and that is associated with the detected client location;
   selecting at least one of said content;
   selecting or drafting a message;
   inputting or selecting one or more recipient addresses; and
   transmitting said electronic postcard comprising said selected one or more of said content and said message to said one or more recipient addresses.

2. The method according to claim 1, wherein the client is a mobile device, handheld device, cellular telephone, smart phone, web-enabled cellular telephone, personal digital assistant, or tablet.

3. The method according to claim 1, wherein said one or more content comprises a collection of digitized and cataloged professional postcards that were published in printed form.

4. The method according to claim 1, wherein said one or more addresses are selected from the group consisting of street addresses, email addresses, social media addresses and phone numbers.

5. The method according to claim 4, wherein said one or more addresses are stored by the client.

6. A system for creating an electronic postcard comprising:
   a server for processing postcards, wherein the server includes content selected from the group consisting of professional-quality photographs, drawings, paintings, images, videos, animation, and any combination thereof;
   at least one location module for detecting the location of a client selected from the group consisting of global positioning system, cellular telephone tower triangulation, Wi-Fi based positioning system, IP address, device sensor, an input received from the client, and any combination thereof;
   a selection module for selecting one or more of said content on the server;
   wherein the selection module selects from the server one or more of said content based on said detected client location;
   a display module for displaying on said client one or more content associated with the detected client location for selection;
   an input module for selecting or inputting a message and one or more recipient addresses; and
   a delivery module for transmitting said electronic postcard comprising said selected one or more of said content and said message to said one or more recipient addresses.

7. The system according to claim 6, wherein the client is a mobile device, handheld device, cellular telephone, smart phone, web-enabled cellular telephone; personal digital assistant or tablet.

8. The system according to claim 6, wherein said one or more content comprises a collection of digitized and cataloged professional postcards that were published in printed form.

9. The system according to claim 6, wherein said one or more addresses are selected from the group consisting of street addresses, email addresses, social media addresses, phone numbers, and any combination thereof.

10. The system according to claim 9, wherein said one or more addresses are stored by the client.

11. A method for creating and sending an electronic postcard comprising:
    a server for processing postcards, wherein the server includes content selected from the group consisting of professional-quality photographs, drawings, paintings, images, videos, animation, and any combination thereof;
    receiving from a client a request for processing electronic postcards;
    detecting location information of the client using a location module that detects the location of the client via at least one selected from the group consisting of global positioning system, cellular telephone tower triangulation, Wi-Fi based positioning system, IP address, device sensor, an input received from the client, and any combination thereof;
    selecting at least one content that is stored in the server and that is associated with the detected client location;
    receiving a selection of at least one message from the client for one or more recipients;
    receiving a selection of one or more recipient addresses;
    creating an electronic postcard comprising said at least one selected content and said at least one message; and transmitting said electronic postcard to said one or more recipient addresses.

12. The method according to claim 11, wherein the client is a mobile device, handheld device, cellular telephone, smart phone, web-enabled cellular telephone, personal digital assistant, or tablet.

13. The method according to claim 11, wherein said plurality of content comprises a collection of digitized and cataloged professional postcards that were published in printed form.

14. The method according to claim 11, wherein said one or more addresses are selected from the group consisting of street addresses, email addresses, social media addresses, phone numbers, and any combination thereof.

15. The method according to claim 11, wherein said electronic postcard is transmitted to said one or more recipient addresses via a network.

16. The method according to claim 11, further comprising the step of:
   printing at least one copy of the electronic postcard; and
   mailing the at least one copy of the electronic postcard to street addresses of one or more recipients.

17. The method according to claim 11, further comprising the step of displaying on said client one or more content associated with the client location for selection.

18. The method according to claim 11, wherein the plurality of content stored on the server are indexed based on locations.

19. The method of claim 11, wherein the at least one message is composed by a user via the client.

20. The method of claim 11, wherein the at least one message is selected from a group of messages stored on the server.

* * * * *